(12) United States Patent
Manivannan et al.

(10) Patent No.: US 12,699,863 B2
(45) Date of Patent: Aug. 4, 2026

(54) DUAL FUNCTIONING SIGNALING DEVICE

(71) Applicant: VORBECK MATERIALS CORP., Jessup, MD (US)

(72) Inventors: Sriram Manivannan, Elkridge, MD (US); James Turney, Halethorpe, MD (US); Trentice Bolar, Jessup, MD (US)

(73) Assignee: Vorbeck Materials Corp., Columbia, MD (US)

( * ) Notice: Subject to any disclaimer, the term of this patent is extended or adjusted under 35 U.S.C. 154(b) by 0 days.

(21) Appl. No.: 18/386,153

(22) Filed: Nov. 1, 2023

(65) Prior Publication Data

US 2025/0181874 A1     Jun. 5, 2025

Related U.S. Application Data

(63) Continuation-in-part of application No. 18/225,081, filed on Jul. 21, 2023, now abandoned.

(60) Provisional application No. 63/354,645, filed on Jun. 22, 2022.

(51) Int. Cl.
*G06K 19/07* (2006.01)
*G06K 19/02* (2006.01)
*G06K 19/077* (2006.01)

(52) U.S. Cl.
CPC ....... *G06K 19/0723* (2013.01); *G06K 19/027* (2013.01); *G06K 19/0702* (2013.01); *G06K 19/0776* (2013.01)

(58) Field of Classification Search
CPC ............. G06K 19/027; G06K 19/0702; G06K 19/0723; G06K 19/0776
See application file for complete search history.

(56) References Cited

U.S. PATENT DOCUMENTS

| | | | |
|---|---|---|---|
| 7,658,901 B2 | 2/2010 | Prud'Homme et al. | |
| 8,278,757 B2 | 10/2012 | Crain et al. | |
| 9,479,241 B2 * | 10/2016 | Pabla | H01Q 21/068 |
| 10,601,104 B2 | 3/2020 | Manivannan et al. | |
| 2010/0197261 A1 * | 8/2010 | Zibrik | H04B 7/0871 |
| | | | 455/230 |
| 2014/0035698 A1 * | 2/2014 | Schadler | H01Q 21/0075 |
| | | | 333/128 |

(Continued)

*Primary Examiner* — Thien M Le

(74) *Attorney, Agent, or Firm* — Woods Oviatt Gilman LLP; Trent V. Bolar, Esq.

(57) ABSTRACT

Embodiments of the instant disclosure relate to dual functioning signaling devices. The device has a signaling unit that includes an active- and semi-passive signaling components. The signaling unit is affixed to and/or positioned within a textile or substrate. The active signaling component includes a transceiver, power source, and input device to allow the user to selectively transmit identifying information. The semi-passive signaling component includes a radio frequency radiator that reflects an EM response signal when exposed to interrogating EM radiation. The operating frequencies of the active- and semi-passive signaling components are configured to not interfere or interference with each other. The active- and semi-passive signaling components both include antenna elements that include a conductive composition that includes fully exfoliated graphene sheets dispersed with a polymer matrix. The textile can be in the form of a pouch, patch, sticker, and/or panel. The textile can be selectably affixed to objects and/or persons.

16 Claims, 8 Drawing Sheets

(56)     References Cited

U.S. PATENT DOCUMENTS

| | | | | |
|---|---|---|---|---|
| 2014/0035792 A1* | 2/2014 | Schadler | ............ | H01Q 21/0087 |
| | | | | 343/798 |
| 2015/0002355 A1* | 1/2015 | Yan | ...................... | H01Q 1/2283 |
| | | | | 343/893 |
| 2019/0020117 A1* | 1/2019 | Cohen | .................... | H01Q 19/08 |
| 2022/0172638 A1* | 6/2022 | Aharonson | ............ | G09B 15/00 |
| 2022/0172639 A1* | 6/2022 | Aharonson | ............ | H04R 1/406 |
| 2022/0172640 A1* | 6/2022 | Aharonson | .............. | G09B 5/02 |
| 2023/0318178 A1* | 10/2023 | Karlsson | ................ | H01Q 21/26 |
| | | | | 343/836 |

* cited by examiner

200

DUAL FUNCTIONING SIGNALING DEVICE

CROSS-REFERENCE TO RELATED APPLICATIONS

This application is a continuation-in-part of U.S. application Ser. No. 18/225,081 filed Jul. 21, 2023, which claims priority to U.S. Provisional Application No. 63/354,645 filed Jun. 22, 2022. These application are hereby incorporated herein by reference.

TECHNICAL FIELD

Background

The instant disclosure relates generally to communications devices and specifically to signaling devices. Signaling devices can be utilized to mark, identify, or screen the presence of an object (e.g., equipment, etc.) or individual (e.g., hikers, soldiers, children, first responders). Signaling devices can employ audible and/or optical signals. Such devices must provide reliable signals in situations where the location, health status, and life of individuals or equipment is threatened and/or sought.

For example, search and rescue (SAR) can be defined as the act of conducting a search, in an effort to locate lost or missing persons or objects, recover and render aid to the victim, evacuating the victim to safety, or recovering a body or object. SAR efforts typically use passive and/or active signaling devices (e.g., electronic, audible, smoke, dyes, flares, panels, reflectors, etc.) to confirm the location and/or identification of people and/or objects. Signaling devices known in the art are typically conspicuous. There exists a need in the space for signaling device that visually inconspicuous.

DETAILED DESCRIPTION

Figure 1A:
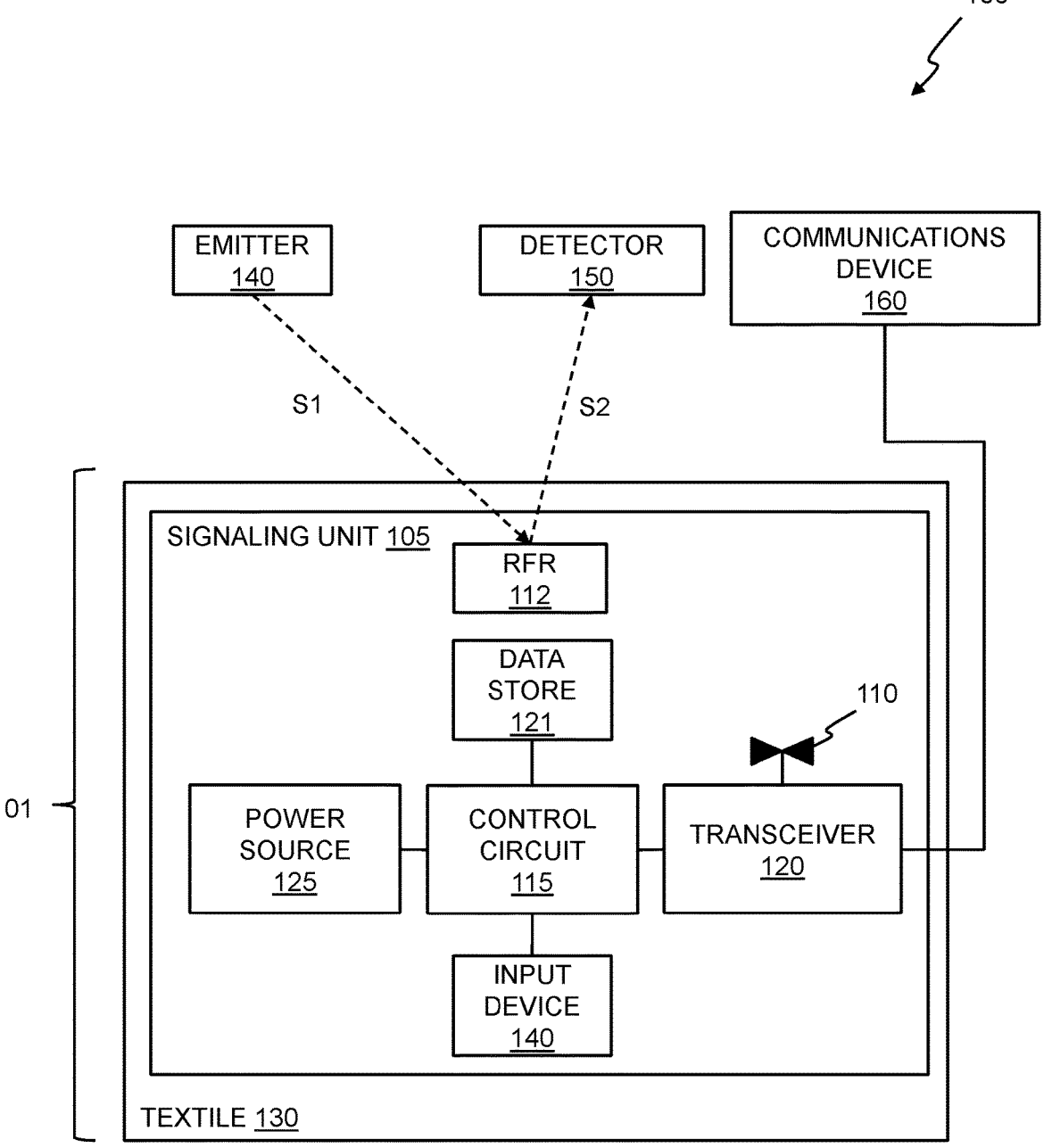
FIG. 1A is a block diagram illustrating a signaling environment that reflects communications between a dual functioning signaling device, a communications device, an RF emitter, and a RF detector, in accordance with some embodiments of the instant disclosure.

The descriptions of the various embodiments of the instant disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, the terms "proximate" and "distal" referring, respectively, to positions or locations that are close or away from a point of reference, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

The instant disclosure relates generally to signaling devices and specifically to dual functioning signaling devices. Signaling devices can be utilized to mark, identify, or screen the presence of objects (e.g., equipment, structures, etc.) or individuals (e.g., hikers, soldiers, children, first responders). Signaling devices can employ audible and/or optical signals. Such devices must provide reliable signals in situations where the location, health status, and life of individuals or equipment is threatened and/or sought.

Search and rescue ("SAR") can be defined as the act of conducting a search, in an effort to locate lost or missing persons or objects, recover and render aid to the victim, evacuating the victim to safety, or recovering a body or object. Passive and/or active signaling devices (e.g., electronic, audible, smoke, dyes, flares, panels, reflectors, etc.) may be used to confirm the location and/or identification of people and/or objects during an SAR operation. Signaling devices known in the art are typically conspicuous (e.g., brightly colored), displaying a visually observable item or illumination, or making a sound audible from a distance. There exists a need in the space for dual functioning signaling device that are inconspicuous.

Embodiments of the instant disclosure seek to provide dual functioning signaling devices that can operate actively and semi-passively. Other aspects of the instant disclosure seek to provide dual functioning signaling devices that can be permanently and/or demountably affixed to individuals as well as objects. Additional aspects of the instant disclosure seek to provide a dual functioning signaling system that includes the dual functioning signaling device(s), an electromagnetic ("EM") emitter, and an EM detector.

Turning now to the Figures. FIG. 1A depicts a block diagram of a signaling environment, generally 100, that reflects communications between a dual functioning signaling device 101, a communications device 160, an RF emitter 140, and a RF detector 150, according to some embodiments. The dual functioning signaling device 101 is a device that can semi-passively and actively generate identifying EM signals (i.e., EM signals that include identifying information). The dual functioning signaling device 101 can include a signaling unit 105 that can include active and semi-passive signaling components. The active signaling components of the signaling unit 105 can include a transceiver 120, an input device 140, a data store 121, and a power source 125 conductively coupled to a control circuit 115. The semi-passive component of the signaling unit 105 can include a radio frequency radiator ("RFR") 112. The signaling unit 105 can be configured to be positioned/affixed within or on a textile 130.

To be sure, the control circuit 115 can be one or more control circuits that work together to perform one or more steps, processes, and/or functions disclosed in the instant disclosure. In certain embodiments, the control circuit 115 can include two or more processing cores that operate as separate processors therein; however, all processing cores may not be active unless needed. Here, the control circuit 115 can execute code using the processing cores at different stages of execution. The control circuit 115 can independently execute two or more instructions threads using the same process resources. In this manner, the control circuit 115 can be used to speed computational processes (e.g., for machine learning, artificial intelligence, or similar functionality).

The control circuit 115 can be any control circuit known in the art capable of performing one or more steps, processes, and/or functions disclosed in the instant application (e.g., microcontrollers, microprocessors, embedded processors, digital signal processors, media processors, application-specific processors, application-specific instruction set processors, ASIC processors, etc.). The data store 121 can be a data store known in the art that can store identifying information (e.g., information about the associated user, the associated object, and/or the dual functioning signaling device 101) and communicate with the control circuit 115. For example, the data store 121 can include one or more of random access memory ("RAM"), read only memory ("ROM"), and erasable programmable read-only memory ("EPROM").

The control circuit 115 can be configured to generate, via the transceiver 120, a RF signal when it receives a transmit signal from the input device 140 conductively coupled to the control circuit 115. The input device 140 can be a switch, button, touch screen, or other input device that can be conductively coupled to the control circuit 115 to send operational signals thereto. Alternatively, the control circuit 115 can be configured to generate, via the transceiver 120, a RF signal at predetermined intervals (e.g., a RF pulse). In some embodiments, the input device 140 and the transceiver 120 can be configured as a single unit or as separate units.

The transceiver 120 can be any transceiver known in the art that can communicate via one or more communication protocols known in the art (or compatible therewith) that include, but are not limited to, UHF, VHF, Long-Term Evolution ("LTE"), 3G, standards based on GSM/EDGE and/or UMTS/HSPA, Wi-Fi, IEEE 802.11 standards, General Packet Radio Service ("GPRS"), local area networking ("LAN") protocols, ("WAN") wide area networking protocols, Bluetooth®, microwave, and similar wireless communications protocols. The transceiver 120 can communicate with communications device 160, which can be any communications device known in the art that can communicate with the transceiver 120 via one or more of the aforementioned communication protocols. The communications device 160 can be attached (permanently or demountably) to a vehicle (e.g., terrestrial, aquatic, aerial, and astronautical) or object (e.g., an antenna tower).

The transceiver 120 is preferably conductively coupled to an antenna element 110 and transmits RF signals thereby. The antenna element 110 is preferably a dipole antenna; however, other antenna types may also be incorporated (e.g., monopole antennas, array antennas, loop antennas, apertures, traveling wave antennas, etc.). The antenna element 110 can be formed using a conductive composition that includes fully exfoliated single sheets of graphene and a polymer. Here, the fully exfoliated single sheets of graphene are present in the polymer matrix as a 3D percolated network.

The antenna element 110 is an electrically conductive object that can be utilized via the transceiver 120 to wirelessly transmit and receive information (i.e., radio waves), according to preferred embodiments. To reduce or eliminate interference, the antenna element 110 is preferably configured to have an operating frequency range that facilitates communication with the communications device 160 but not interfere with the operating frequency of the emitter 140 or the detector 150. In other words, the operating frequencies of the antenna element 110, the emitter 140, and the detector 150 are dissimilar and non-overlapping. The antenna element 110 can be configured to substantially conform to the contours of the user and/or object the dual functioning signaling device 100 is coupled to. The antenna element 110 can be a substantially planar, flexible, and bendable structure that has a reduced visual signature (e.g., less than 10 mm thick). For example, the antenna element 110 can have a radius of curvature of about 0.5 mm to about 144 inches to result in sufficient flexibility to be wrapped or applied around curved surfaces. The antenna element 110 can be formed (e.g., via printing, molding, coating, casting, stamping, die cutting and similar deposition techniques) on a substrate using the aforementioned conductive composition. In certain embodiments, the antenna element 110 can be pre-formed and subsequently affixed to the substrate.

Applicable substrates can include, but are not limited to, flexible and/or stretchable materials, silicones, other elastomers, other polymeric materials, metals (such as aluminum, copper, steel, and stainless steel), adhesives, heat-sealable materials (such as cellulose, biaxially oriented polypropylene ("BOPP"), poly(lactic acid), and polyurethanes), fabrics (including cloths and textiles) and articles (such as cotton, wool, polyesters, and rayon), clothing, garments, glasses and other minerals, ceramics, silicon surfaces, wood, paper, cardboard, paperboard, cellulose-based materials, glassine, silicon and other semiconductors, laminates, and corrugated materials. Applicable substrates can be in the form of films, papers, wafers, silicon wafers, and/or larger three-dimensional objects.

The substrates can be treated with other coatings (such as paints) or similar materials prior to the application of the conductive composition. For example, the substrates can be coated with indium tin oxide, and/or antimony tin oxide (as well as other similar conducting oxides). The substrates may be woven, nonwoven, as well as in mesh form. The substrates can include cellulose-based materials (e.g., including, but not limited to paper, paperboard, cardboard, glassine, and other cellulose-based materials). Cellulose-based materials can be surface treated. Examples of surface treatments include coatings such as polymeric coatings, which can include, but are not limited to, PET, polyethylene, polypropylene, acetates, and nitrocellulose.

Turning now to the conductive composition. The fully exfoliated single sheets of graphene preferably form a three-dimensional percolated network within the polymer(s), which yields superior conductivity for the composition compared to un-percolated compositions that must rely more on the conductivity of the polymer and/or an electrically conductive addictive (i.e., non-fully exfoliated single sheets of graphene additives). Not to be limited by theory, at percolation threshold, the fully exfoliated single sheets of graphene are dispersed in such a manner that one or more continuous conductive networks are formed throughout the polymer matrix.

When present as a three-dimensional percolated network, the fully exfoliated single sheets of graphene are separated on a nanoscale within the polymer matrix, which thereby improves mechanical, electrical, thermal, impermeability and other properties. In contrast, when not present as a percolated network, the fully exfoliated single sheets of graphene are not separated on a nanoscale and are, in contrast, positioned more distant to each other within the polymer matrix, which thereby deteriorates or lowers conductivity (as well as one or more of the aforementioned properties). The fully exfoliated single sheets of graphene are about 1 nm thick as well as substantially planar.

In certain embodiments, the fully exfoliated single sheets of graphene have surface imperfection (i.e., "wrinkles" or "kinks") resulting from the presence of lattice defects in, or by chemical functionalization of the two-dimensional hexagonal lattice structure of the basal plane. Applicable polymers include, but are not limited to, polyethylene terephthalate, acrylic, rayon, aramid, modacrylic, spandex, nylon, olefin, polyester, saran, sulfur, polypropylene, polyethylene, elastane, and similar polymers.

The fully exfoliated graphene sheets (i.e., the graphene sheets) and/or the conductive composition can be generated as disclosed in U.S. Pat. No. 7,658,901 B2 by Prud'Homme et al; U.S. Pat. No. 8,278,757 B2 by Crain; US Patent Pub. No. 2011/0189452 A1 by Lettow et al.; and US Patent Pub. No. 2014/0050903 A1 by Lettow et al., which are each hereby incorporated by reference in their entirety. The fully exfoliated graphene sheets preferably have a surface area of about 2,630 $m^2$/g to promote a low percolation threshold of, for example, 0.52 vol. %. To be sure, neither carbon nanotubes (e.g., SWCNT or MWCNT) nor graphite are comparable substitutes of the aforementioned fully exfoliated graphene sheets due the different inherit structural, electrical, and mechanical properties of the materials.

For example, the fully exfoliated graphene sheets have a platy (e.g., two-dimensional) structure as opposed to the three-dimensional structure of carbon nanotubes and graphite, which results in higher percolation thresholds. The lower percolation threshold is due to a higher aspect ratio of the fully exfoliated graphene sheets and their excellent homogenous dispersion in the conductive composition. The fully exfoliated graphene sheets have higher surface-to volume ratios than carbon nanotubes owing to the inaccessibility of the inner nanotube surface to polymer molecules. This is theorized to make graphene sheets more favorable for altering all matrix properties-such as the mechanical, rheological and permeability properties, and degradation stability.

The textile 130 can include polymeric materials (e.g., plastics, rubbers, etc.) as well as natural materials (e.g., leather, cotton, etc.). The textile 130 can include a compartment (e.g., a pouch, pocket, sack, reticule) to hold the signaling unit 105. Alternatively, the textile 130 can include a panel that the signaling unit 105 is affixed to. The textile 130 can be configured to allow the dual functioning signaling device 100 to be affixed to any surface (e.g., garments, wearable accessories, equipment, vehicles, etc.) using demountable fasteners (e.g., snap fasteners, hook-and-loop fasteners, or other demountable fasteners known in the art) and/or permanent fasteners. The dual functioning signaling device 100 preferably includes an active component and a semi-passive component. The power source 125 can power the active components and include one or more electrochemical cells. The power source 125 can be a primary battery or a secondary battery. In general, the power source 125 can be any battery that can power the transceiver 120.

Figure 1B:
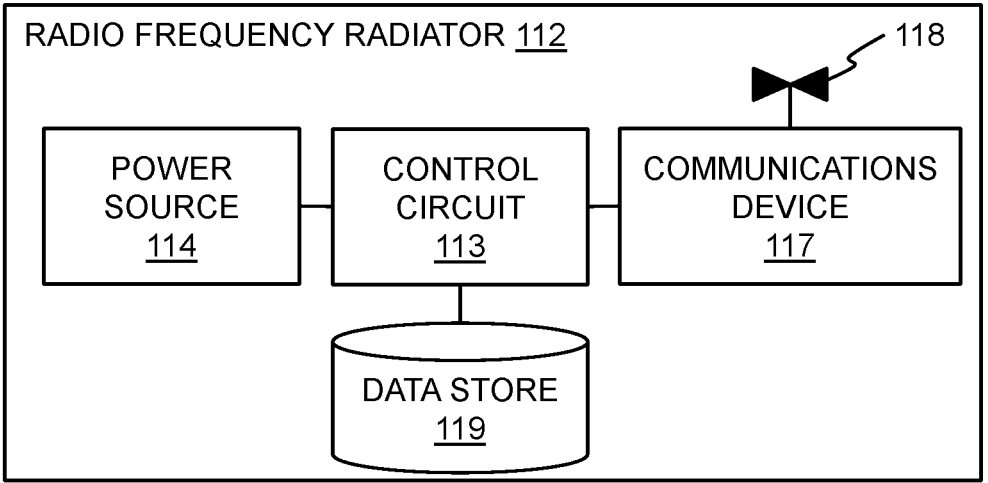
FIG. 1B is a block diagram illustrating a radio frequency radiator, in accordance with certain embodiments.

FIG. 1B is a block diagram illustrating a radio frequency radiator, in accordance with certain embodiments. The RFR 112 is a semi-passive signaling device that communicates via back scatter and preferably includes a control circuit 113 conductively coupled to a power source 114, a data store 119, and a communications device 117. The RFR 112 is configured to reflect an EM response signal (e.g., signal "S2" of FIG. 1) when exposed to an interrogating EM radiation (e.g., signal "S1" of FIG. 1). The power source 114 is a power source known in the art and can share one or more features and/or components with the power source 125. The control circuit 113 is a control circuit known in the art and can share one or more features and/or components with the control circuit 115.

The data store 119 can be any data store known in the art that can store identifying information (e.g., information about the associated user, the associated object, and/or the dual functioning signaling device) and communicate with the control circuit 113. For example, the data store 119 can include one or more of random access memory ("RAM"), read only memory ("ROM"), and erasable programmable read-only memory ("EPROM"). The communications device 117 is conductively coupled to an antenna element 118. The communications device 117 can function as a transponder, radio receiver, and/or transmitter. To reduce interference, the antenna element 118 is preferably configured to have an operating frequency range that facilitates communication with the emitter 140 or the detector 150 but not interfere with the operating frequency of the communications device 160. In other words, the operating frequencies of the antenna element 110, the antenna element 118, the emitter 140, and the detector 150 are dissimilar, non-overlapping, and do not interfere with each other.

Not to be limited by theory, as the antenna element 118 receives the interrogating EM radiation, the propagating signal gives rise to a potential difference across the dipole antenna (i.e., the antenna element 118), which causes current to flow in a capacitor of the control circuit 113, which activates the control circuit 113 to thereby cause the communications device 117 to transmit the EM response signal (S1) via the antenna element 118. In other words, when exposed to the interrogating EM radiation of the emitter 140, the RFR 112 transmits the appropriate identifying information stored in the data store 119 (i.e., the response signal, S2) back to the originating EM emitter 150.

The antenna element 118 includes a conductive antenna pattern (e.g., a dipole antenna pattern). The antenna pattern can be formed using the conductive composition. For example, the antenna pattern can be printed on to a substrate (e.g., applicable substrates include those listed above for the antenna element 110) using the conductive composition. The RFR 112 can be configured to receive interrogating EM radiation (e.g., S1 of FIG. 1) and reflect an EM response signal (e.g., S2 of FIG. 1) within a predetermined frequency range when exposed thereto. To be sure, operation of the RFR 112 does not interfere with that of the transceiver 120. In other words, the operating bandwidth of the antenna element 110 does not include/overlap that of the antenna element 118, which allows the transceiver 120 to exclusively communicate with the communications device 160 and the RFR 112 to exclusively receive S1 and transmit S2.

The EM response signal (S2) is preferably configured to a specific EM frequency of the detector 150. The EM response signal can include identifying information and/or locating information of the RFR 112. In some embodiments, the dual functioning signaling device 101 includes two or more copies of the RFR 112 present as a plurality of segmented portions that are each detachable where each segmented portion is configured to reflect the EM response signal when exposed to the interrogating EM radiation. In other words, the RFR 112 can be configured to be separable from an underlying frame or surface section of the dual functioning signaling device 101.

Figure 2:
FIG. 2 illustrates a cross-section of a signaling unit of the dual functioning signaling device of FIG. 1A, in accordance with other embodiments of the instant disclosure.
Figure 2:
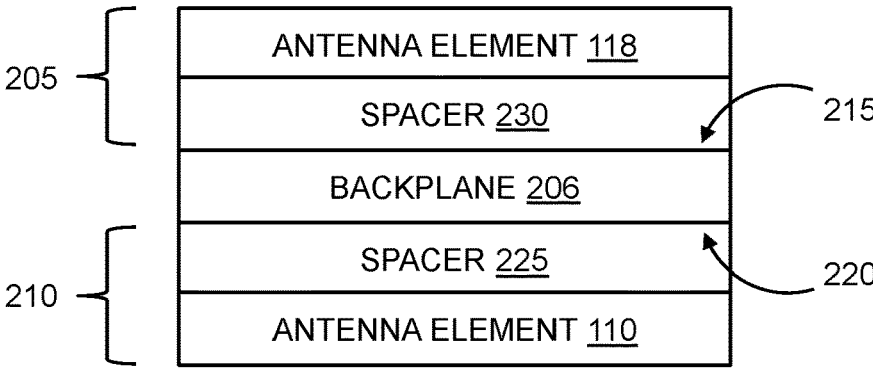
Figure 3:
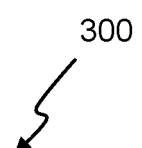
FIG. 3 illustrates a cross-section of a signaling unit of the dual functioning signaling device of FIG. 1A, in accordance with certain embodiments of the instant disclosure.
Figure 3:
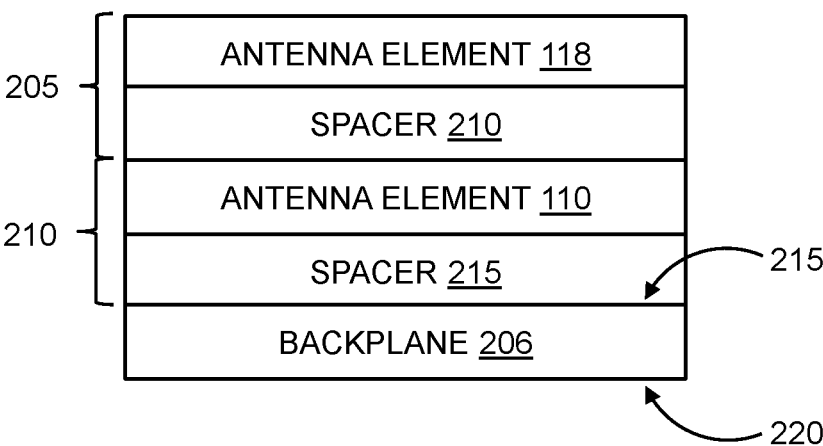
Figure 4:
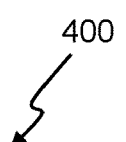
FIG. 4 illustrates a cross-section of a signaling unit of the dual functioning signaling device of FIG. 1A, in accordance with yet still other embodiments of the instant disclosure.
Figure 4:
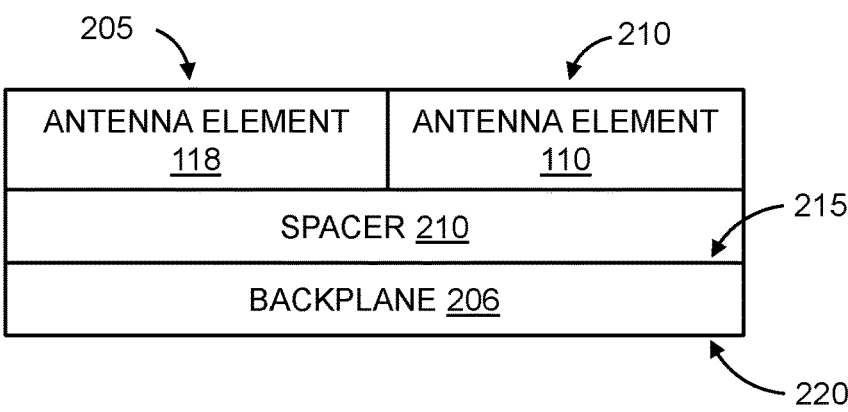

FIGS. 2-4 depicts various configurations of the signaling unit 101. To simplify the discussion, the signaling units of FIGS. 2-4 are depicted without the power sources 114 and 125, the control circuits 113 and 115, the transceiver 120, the communications device 117, the data stores 119 and 121, or the input device 140. FIG. 2 illustrates a cross-section of a signaling unit, generally 200, according to other embodiments. The signaling unit 200 is one of a plurality of configurations of the signaling unit 101 and can share one or more components and/or functionalities therewith.

FIGS. 2-4 illustrate cross-sections of a dual functioning signaling unit, generally 200, 300, and 400, respectively, in accordance with other embodiments of the instant disclosure. As illustrated, the dual functioning signaling device 105 can have many different configurations of structures and component layouts. For example, the backplane 206, the antenna element 110, and/or the antenna element 118 can be configured to be substantially planar. The backplane 206, the antenna element 110, and/or the antenna element 118 can be configured to be substantially three-dimensional. The backplane 206, the antenna element 110, and/or the antenna element 118 can be formed using the conductive composition. The backplane 206 is preferably configured to reflect EM radiation generated by the antenna element 110 away from the antenna element 118 and EM radiation generated by the antenna element 118 away from the antenna element 110 (as well as the user or object to which the signaling unit 101 is coupled thereto).

The dual functioning signaling device 101 can be configured to reduce and/or eliminate the amount of its EM radiation that the user (e.g., a user 501) or the object (e.g., a vehicle 620) absorbs. In other words, the dual functioning signaling device 101 can be configured to minimize and/or eliminate the user's or the objects EM exposure (e.g., reduce the user's specific absorption rate) caused by the dual functioning signaling device 101. Specific absorption rate is a measure of the rate at which energy is absorbed per unit mass by a human body when exposed to a radio frequency electromagnetic field. The backplane 206 can be positioned proximate to the antenna element 110 and the antenna element 118. The antenna element 110 can be positioned proximate to the backplane 206 and the antenna element 118.

As depicted in FIG. 2, the antenna element 118 can be positioned proximate to a first side 215 of the backplane 206. The antenna element 110 can be positioned proximate to a second side 220 of the backplane 206 opposite the antenna element 118. The first side 215 is positioned opposite the second side 220. Here, an active component 210 (i.e., the antenna element 110, the transceiver 120, the control circuit 115 and the power source 125) is positioned opposite a semi-passive component 205 (i.e., the RFR 112). The spacers 225 and 230 ("the spacers") can be positioned between the aforementioned components to reduce or eliminate EM interference with nearby components. As used herein, "spacer" refers to an electrically insulating structure that may be substantially rigid or flexible.

The spacers are positioned in a manner to reduce or eliminate the ability of EM radiation produced by the active component 210 to interfere with the functionality of the semi-passive component 205 and vis-versa. The spacers can be substantially planar and/or be configured to have any shape that supports an embodiment of the instant disclosure. The spacers can be formed or positioned on either side of the backplane 206 (e.g., the first side 215 and the second side 220). The spacers can be pre-formed and subsequently affixed to a side of the backplane 206. The spacers can be formed via printing, casting, molding, die cutting, coating, painting, and/or similar techniques.

The spacers can be three-dimensionally printed using an insulating composition. The spacers can be formed using one or more insulating materials. Applicable insulating materials can include, but are not limited to, polystyrene, polyethylene, neoprene, acrylic, acrylonitrile butadiene styrene, nylon, polybenzimidazole, polypropylene, polyvinyl chloride, polymer polytetrafluoroethylene, a fluoropolymers. To use the dual functioning signaling device 200, the user can orient the semi-passive component 205 away from themselves in a desired direction when semi-passive signaling with the RFR 112 is desired. Alternatively, the user can orient the active component 210 away from themselves in a desired direction when active signaling is desired.

As depicted in FIG. 3, the antenna element 118 and the antenna element 110 can each be positioned on the same side (e.g., the first side 215) of the backplane 206, respectively. The signaling unit 300 is one of a plurality of configurations of the signaling unit 101 and can share one or more components and/or functionalities therewith. As depicted, the semi-passive component 205 is positioned on the active component 210, which is positioned on the backplane 206. Unlike the signaling unit 200, the dual functioning signaling device 300 does not have to be reoriented when switching between semi-passive signaling and active signaling because both the semi-passive component 205 and the active component 210 are oriented in the same direction and positioned on the same side (e.g., the first side 215) of the backplane 206.

As depicted in FIG. 4, the semi-passive component 205 is positioned adjacent to the active component 210 and are both positioned on the spacer 210, which is positioned on the backplane 206. The dual functioning signaling unit 400 is one of a plurality of configurations of the signaling unit 101 and can share one or more components and/or functionalities therewith. Similar to the signaling device 300, the dual functioning signaling device 400 does not have to be reoriented when switching between semi-passive signaling and active signaling because both the antenna element 118 (the semi-passive component 205) and the antenna element 110 (the active component 210) are oriented in the same direction relative to the backplane 206.

Figure 5:
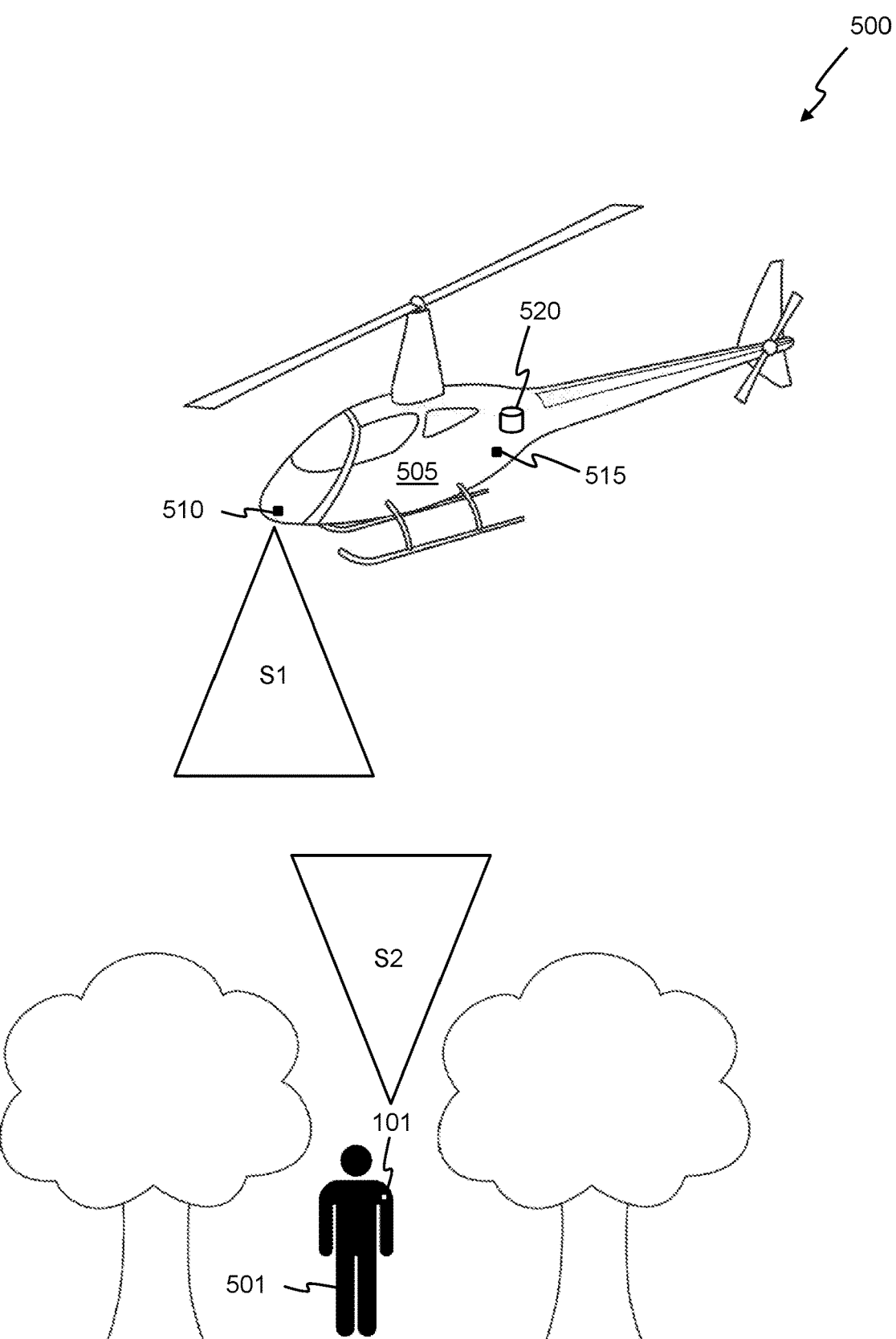
FIG. 5 illustrates a signaling scheme involving a user and an aerial vehicle that includes an EM source and an EM detector, in accordance with some embodiments of the instant disclosure.
Figure 6:
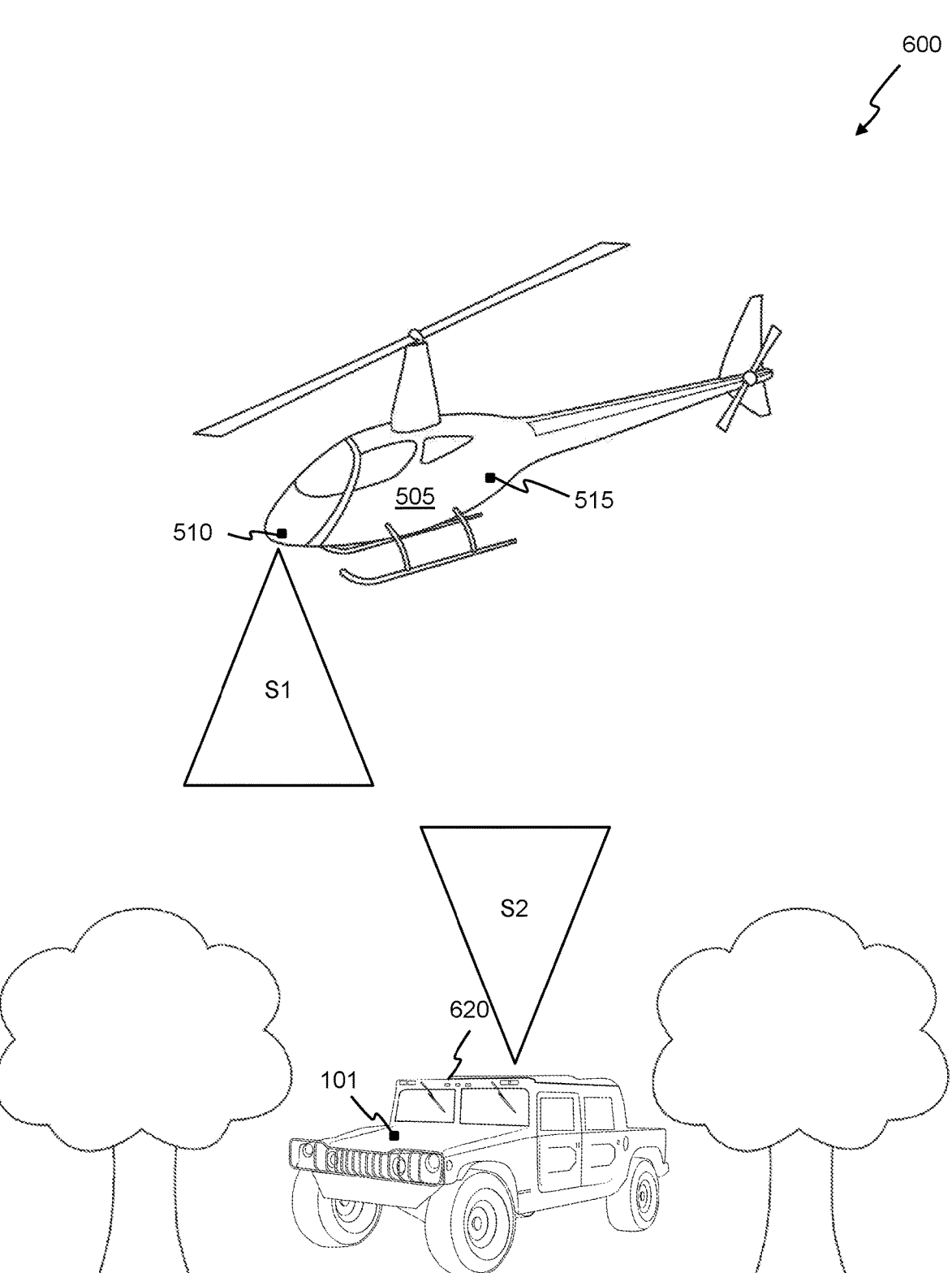
FIG. 6 illustrates a signaling scheme involving a vehicle and the aerial vehicle of FIG. 5, in accordance with other embodiments of the instant disclosure.

Turning now to FIGS. 5-6. The dual functioning signaling device 101 can be configured to be worn and/or affixed to (permanently or demountably) a user or object. For example, the textile 130 can be configured as a flexible receptacle (e.g., a pouch) with the signaling unit 105 positioned therein. The flexible receptacle can include an open end that selectably opens to allow access to the dual functioning signaling device 101 positioned therein (e.g., for activating the active component, accessing the input device 140, as well as other manipulations of the dual functioning signaling device 100). The receptacle can include a demountable fastener (e.g., hook-and-loop fasteners, buttons, clips, snap fasteners, snap-fittings, bolts, latch, magnets, and other demountable fasteners) and/or a non-demountable fastener (e.g., crimp, glue, adhesive, cabling, screws, nails).

Figure 7:
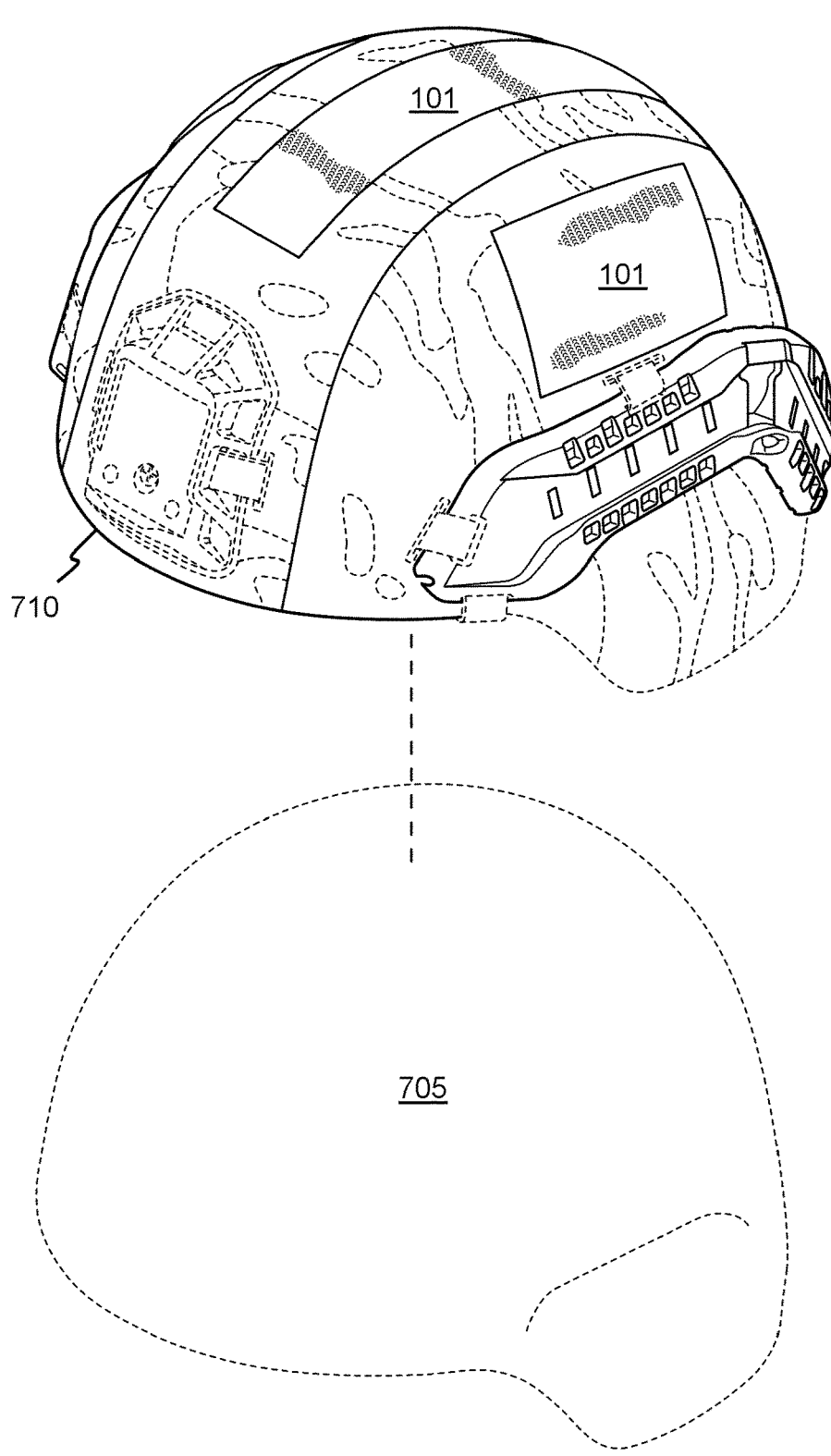
FIG. 7 illustrates a helmet cover with the dual functioning signaling device of FIG. 1A externally affixed thereto, in accordance with certain embodiments of the instant disclosure.

As used herein, "demountable fastener" refers to a hardware device that demountably and mechanically joins or affixes two or more objects together. The demountable fastener can demountably couple the flexible receptacle to a surface (e.g., a user, a garment item, an object, and similar surfaces). The textile 130 can be a panel (e.g., that includes a woven/non-woven fabric and/or a polymeric material). The dual functioning signaling device 101 can be affixed to the panel in a manner that allows the demountable fastener to demountably couple the panel to a surface. FIG. 7 depicts a helmet cover, generally 710, that is configured to cover a helmet, generally 705, according to yet still other embodiments. The dual functioning signaling device 101 is preferably affixed to the outward-facing surfaces (e.g., top, back, and/or side surfaces) of the helmet cover 710; however, the dual functioning signaling device 101 can be affixed to inward-facing surfaces thereof. When affixed to such inward-facing surfaces, the helmet cover 710 should be made of EM transparent material to reduce the probability that the material of the helmet cover 710 interferes with the EM signal S1 and the EM signal S2.

FIG. 5 illustrates a signaling environment, generally 500, involving the user 501 and a vehicle, generally 505, that includes an EM emitter 510 and an EM detector 515, in accordance with some embodiments of the instant disclosure. Although depicted as an aerial vehicle, the vehicle 505 can be a terrestrial vehicle, aquatic vehicle, or astronautical vehicle. Here, FIG. 5 depicts the user 501 as being positioned amongst trees, but other locations are applicable (e.g., mountains, urban environments, subterranean environments. The signaling environment 500 depicts the user 100 and the dual functioning signaling device 101 demountably coupled thereto. The vehicle 505 can be used to determine the position or identification of an object(s) (e.g., the user 501 or other objects capable to which the dual functioning signaling device 101 can adhere).

Here, the EM emitter 510 generates the aforementioned EM signal S1 (i.e., the interrogating EM radiation) and is configured to direct at least a portion thereof towards the forest positioned below the vehicle 505 (i.e., the area of interest). In other words, the EM emitter 510 is a device that transmits an EM wave and modulates that wave to carry data. Generally, the EM emitter 510 can be any EM emitter known in the art capable of emitting the EM signal S1.

The dual functioning signaling device 101, via RFR 112, reflects EM signal S2 (i.e., the EM response signal) when exposed to EM signal S1. The vehicle 505 can include a computing device (i.e., a second control circuit) that is communicatively coupled to a data store (e.g., data store 520). In some embodiments, the vehicle 505 does not include the data store 520 but rather is positioned distal to the vehicle (e.g., within a communicable distance thereto). In other embodiments, the EM emitter 510 and the EM detector 515 are not included in the same vehicle but rather are associated with separate (i.e., different) vehicles and/or objects. For example, the data store 520 can include data associated with a known frequency combination (e.g., information included in EM signal S2). The EM emitter 510 can emit the interrogating EM radiation (i.e., EM signal S1). The computing device can determine whether the EM response signal (i.e., EM signal S2) includes the known frequency combination.

In some embodiments, the EM emitter 510 and the EM detector 515 are positioned on separate vehicles or objects. In other embodiments, the dual functioning signaling device 101 is positioned near the user 501 as opposed to being positioned thereon. FIG. 6 illustrates a signaling environment, generally 600, that includes the vehicle 505 and a vehicle 620. Although the vehicle 620 is depicted as a terrestrial vehicle, the vehicle 620 can be an aquatic vehicle, aerial vehicle, astronautical vehicle, or other equipment. Here, the dual functioning signaling device 101 can be permanently or demountably affixed to the vehicle 620.

Based on the foregoing, a signaling device, a signaling system, and method have been disclosed in accordance with the instant disclosure. However, numerous modifications and substitutions can be made without deviating from the scope of the instant disclosure. Therefore, the instant disclosure has been disclosed by way of example and not limitation.

What is claimed is:

1. A dual functioning signaling device, comprising:
a signaling unit comprising:
a backplane;
an antenna element;
a radio frequency radiator ("RFR");
a transceiver conductively coupled to the antenna element;
a control circuit conductively coupled to the transceiver;
wherein
one or more of the backplane, the antenna element, and the RFR are substantially planar;
the antenna element
is positioned proximate to the backplane and the RFR;
operates at an antenna frequency range;
the backplane
is positioned proximate to the antenna element and the RFR;

reflects electromagnetic ("EM") radiation generated by at least one of the antenna element and the RFR away from the signaling unit;

the RFR reflects an EM response signal within a predetermined frequency range when exposed to an interrogating EM radiation, the EM response signal comprises predetermined identifying information;

the control circuit is configured to generate, via the transceiver, a RF signal when it receives a transmit signal from an input device conductively coupled to the control circuit;

or at predetermined time intervals;

the RFR comprises:

a conductor;

a second control circuit;

a second transceiver;

the second control circuit is communicatively coupled to the second transceiver;

the second transceiver is conductively coupled to the conductor;

the second control circuit is configured to:

generate, via the second transceiver, the EM response signal when the conductor is exposed to the interrogating EM radiation;

transmit, via the second transceiver, the EM response signal using the conductor;

at least one of the antenna element and the RFR comprise a conductive composition;

the conductive composition comprises:

fully exfoliated single sheets of graphene;

a polymer; and the fully exfoliated single sheets of graphene are present in the polymer matrix as a 3D percolated network.

2. The dual functioning signaling device of claim 1, wherein:

the RFR is positioned on a first side of the backplane;

the antenna element is positioned on a second side of the backplane opposite the RFR; and the first side is positioned opposite the second side.

3. The dual functioning signaling device of claim 1, wherein the RFR and the antenna element are positioned on a first side of the backplane.

4. The dual functioning signaling device of claim 1, wherein the signaling device is coupled to a helmet cover.

5. The dual functioning signaling device of claim 1, wherein the signaling unit is positioned within a pouch;

the pouch comprises a demountable fastener; and the demountable fastener demountably couples the pouch to a surface.

6. The dual functioning signaling device of claim 1, wherein the signaling unit is coupled to a panel;

the panel comprises a demountable fastener; and the demountable fastener demountably couples the panel to a surface.

7. A signaling system, comprising:

the dual functioning signaling device of claim 1;

an EM emitter;

an EM detector;

a third control circuit;

12 wherein the third control circuit is communicatively coupled to a datastore;

the EM detector;

the datastore comprises identification data;

the EM emitter emits the interrogating EM radiation;

the EM detector captures the EM response signal; and the third control circuit is configured to determine whether the identification data comprises the known frequency combination.

8. The signaling system of claim 7, wherein the RFR comprises:

a conductor;

a second control circuit;

a second transceiver;

the second control circuit is communicatively coupled to the second transceiver;

the second transceiver is conductively coupled to the conductor;

the second control circuit is configured to:

generate, via the second transceiver, the EM response signal when the conductor is exposed to the interrogating EM radiation; and transmit, via the second transceiver, the EM response signal using the conductor.

9. The signaling system of claim 8, wherein one or more of the antenna element and the conductor comprises a conductive composition;

the conductive composition comprises:

fully exfoliated single sheets of graphene;

a polymer; and the fully exfoliated single sheets of graphene are present as in the polymer matrix as a 3D percolated network.

10. The signaling system of claim 8, wherein the RFR is positioned on a first side of the backplane;

the antenna element is positioned on the first side or a second side of the backplane opposite the RFR; and the first side is positioned opposite the second side.

11. The signaling system of claim 10, wherein the EM emitter is associated with an aerial vehicle, a terrestrial vehicle, an astronautical vehicle, or an aquatic vehicle.

12. A method for manufacturing a dual functioning signaling device, comprising:

forming a backplane;

forming a radio frequency radiator ("RFR") that reflects an EM response signal within a predetermined frequency range when exposed to interrogating EM radiation;

forming an antenna element that operates at an antenna frequency range;

positioning the antenna element proximate to both the backplane and the RFR;

positioning the backplane proximate to the antenna element and the RFR to thereby allow the backplane to reflect EM radiation generated by at least one of the antenna element and the RFR;

conductively coupling the antenna element to a transceiver;

conductively coupling the transceiver to a control circuit to thereby form a signaling unit, the control circuit configured to utilize the transceiver to generate a RF signal when the control circuit receives a transmit signal from an input device conductively coupled to the control circuit or at predetermined intervals;

wherein
  forming the RFR comprises:
    forming a conductor;
    communicatively coupling a second control circuit to a second transceiver;
    communicatively coupling the second transceiver to the conductor;
    configuring the second control circuit to:
      generate, via the second transceiver, the EM response signal when the conductor is exposed to the interrogating EM radiation;
      transmit, via the second transceiver, the EM response signal using the conductor;
  forming the antenna element comprises forming the antenna element using a conductive composition;
  the conductive composition comprises:
    fully exfoliated single sheets of graphene;
    a polymer; and
  the fully exfoliated single sheets of graphene are present as in the polymer matrix as a 3D percolated network.

13. The method of claim 12, wherein forming the conductor comprises forming a conductive pattern on a substrate using the conductive composition.

14. The method of claim 13, further comprising:

positioning the signaling unit within a pouch; and the pouch comprises a demountable fastener that demountably couples the pouch to a surface.

15. The method of claim 13, further comprising:

coupling the signaling unit to a panel; and the panel comprises a demountable fastener that demountably couples the pouch to a surface.

16. The method of claim 13, further comprising:

coupling the signaling unit to a surface; or integrating the signaling unit within the surface.

\* \* \* \* \*